Figure 1:
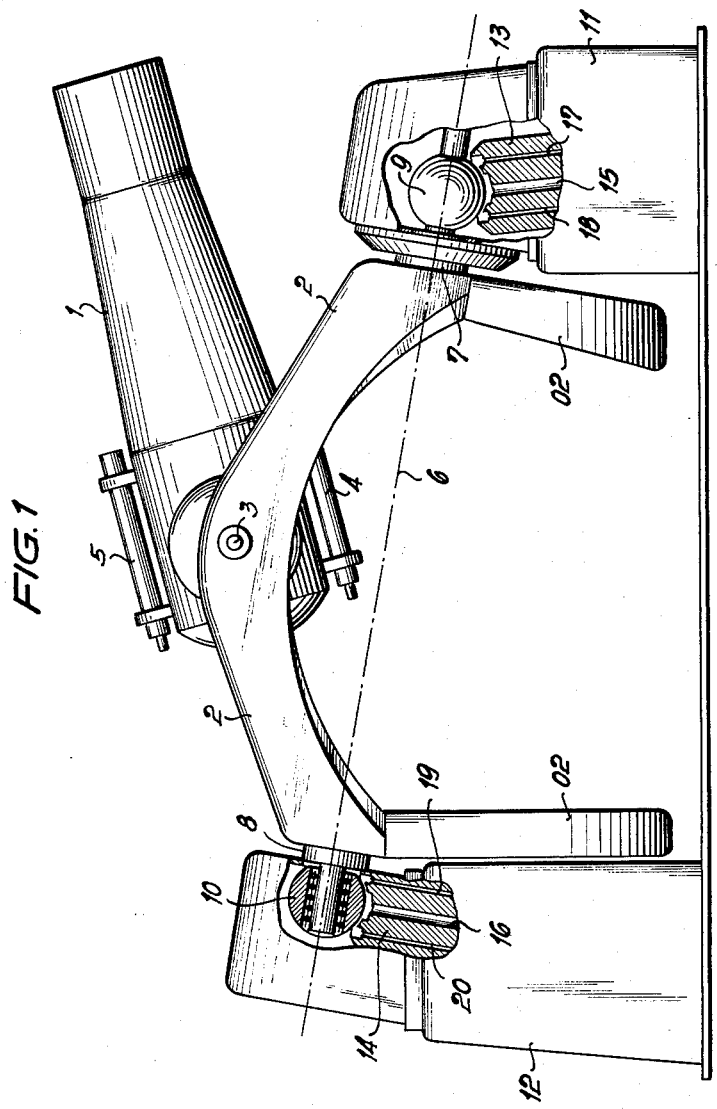

April 25, 1961 C. KÜHNE 2,981,572
HYDROSTATIC BEARING SYSTEM
Filed April 23, 1958 2 Sheets-Sheet 1

INVENTOR
Christoph Kuehne
BY
ATTORNEY

INVENTOR
Christoph Kuehne

2,981,572

HYDROSTATIC BEARING SYSTEM

Christoph Kühne, Berlin-Zehlendorf, Germany, assignor to Askania-Werke A.G., Berlin-Friedenau, Germany, a corporation of Germany Filed Apr. 23, 1958, Ser. No. 730,352

Claims priority, application Germany May 10, 1957

2 Claims. (Cl. 308—9)

This invention relates to a lubricant control system for a hydrostatic bearing of high precision, particularly for instance a system of this type for bearings of a large and heavy reflector telescope.

An instrument of this type must follow the apparent motion of a star with an accuracy of small fractions of an angular second. For this purpose the bearings accommodating the diurnal motion of the instrument must support an axis of many centimeters length with an accuracy of a very few microns; and the slow motion of the axis must be subject to a minimum of disturbance by friction. It is known for this purpose to support the axle on a lubricant layer of a few hundred microns thickness and substantially to maintain such a layer in each bearing, either by pumping lubricant into each bearing by a separate pump of suitable type or by using a single pump for two or more bearings and interposing restrictors between the pump and each bearing. It is also known to arrange the lubricant control system, comprising the pumps, restrictors, bearings etc., so as to feed constant volumes of lubricant, or so as to maintain constant pressure relations between different bearings; but even with the use of such refinements the required precision has not been obtained. This applies also to the requirements of spindle bearings for high precision lathes and the like.

The present invention satisfies such requirements, whereby it increases the precision of bearings by at least an order of magnitude.

Figure 2:
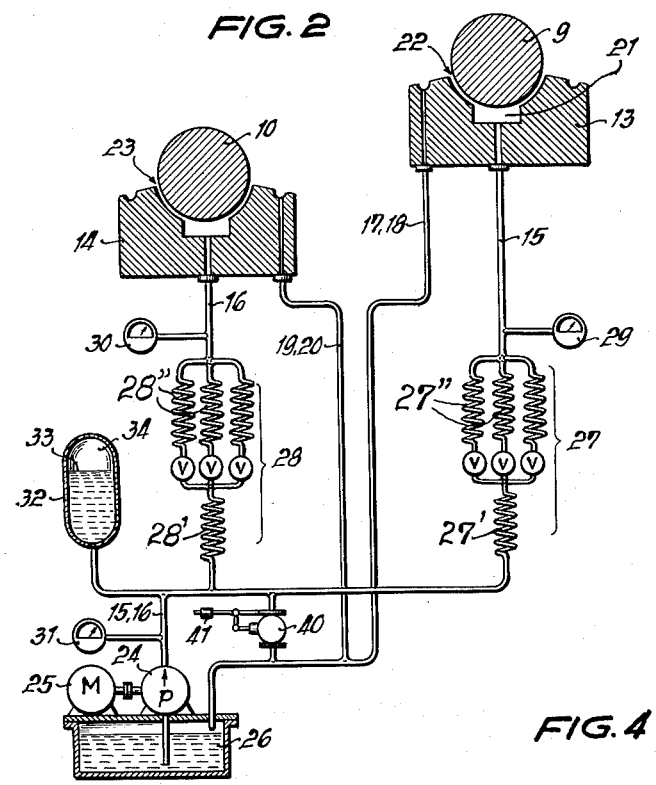
Figure 3:
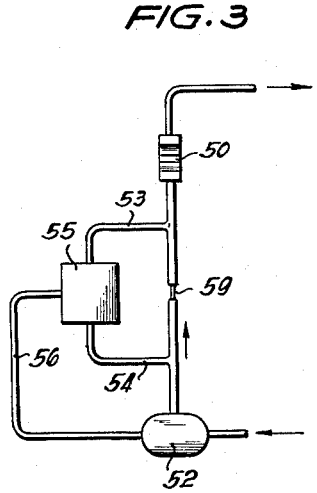
Figure 4:
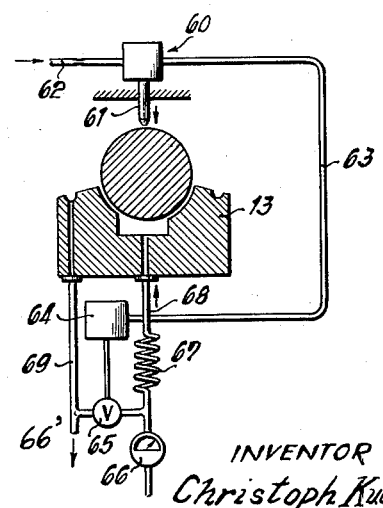

One aspect of the general principle of the invention is that the lubricant system comprises means for maintaining a constant ratio of lubricant pressures ahead of and behind the restrictors through which the lubricant flows to the different bearings. The flow employed is a laminar one and the pressures are most effectively varied by systems of capillary throttles. These and other details will best be described in conjunction with the drawing, wherein:

Figure 1 is a side elevation of a telescope supported on bearings of the type considered herein, such bearings being shown in section. Figure 2 is a diagram of the lubricant system for said bearings. Figure 3 is schematic block diagram of such a lubricant system. Figure 4 is a diagram generally similar to Figure 2 and showing a further modification of the system.

Figure 1 shows a reflector telescope 1 mounted in a frame 2 by declination axis 3. The frame, carrying the telescope and the finders 4, 5, is rotatable about the axis 6 of an hour-circle 7 and is connected by trunnions 8 with spherical bearing members 9, 10 which are supported respectively on socket supports 11, 12, each sphere being movable in a socket 13, 14 on one of said supports. Telescope 1 and frame 2 are counterweighted, the latter at 02, to establish equilibrium at every hourly position and declination; these different positions being established and modified by well-known mechanisms, not shown.

According to the invention, the axis 6 is maintained in space with tolerances of small fractions of an angular second, by means of a lubricant system for bearings 9, 10 which system includes lubricant feed passages 15, 16 leading to each bearing and outlet passages 17, 18 and 19, 20 from each bearing area. Between these feed and outlet passages of each bearing an effective bearing zone is provided, which as mentioned may be a few hundred microns wide and which, in order to maintain said small tolerances of angular positioning of axis 6, is prevented from varying by more than a very few microns at the very most. It will be understood that such precision would be much easier to obtain if no motion were required between bearing elements 9, 13 and similarly between bearing elements 10, 14, in which case it would be possible to maintain metal to metal contact between spheres and sockets and to adjust it by suitable micrometers. For many applications it may further be stated that precision would at least be somewhat easier to obtain if the motion between spheres and sockets were rapid and if accordingly a hydrodynamically lubricated bearing system, with a relatively thin lubricant layer, could be utilized. In the hydrodynamic bearing the thickness of the lubricant layer is largely determined by motion; other influences are relatively minimized. In the hydrostatic bearing, by contrast, other influences, including notably those of variable viscosity of the lubricant, are substantial. This has been found to be a principal reason for the fact that sufficient accuracy has not heretofore been provided, even when constant volumes of lubricant were fed at all times and/or constant ratios of lubricant pressure maintained between different bearings.

The lubricant system for bearings 9, 13 and 10, 14 is shown in Figure 2. The bearing zones containing the critical lubricant layers are here shown at 22, 23, respectively, for said two bearings. They are supplied with a suitable oil or the like as lubricant by a pump 24 driven by a motor 25 and connected to oil sump 26. The hydraulic conditions in bearing zones 22, 23 are generally characterized by laminar flows of lubricant through said zones; and laminar flows are also maintained in a control zone 27, 28 of each feed passage 15, 16. Each control zone is shown as comprising a fixed capillary passage 27', 28' in series with a system 27'', 28'' of variable capillary passages. These variable passages may for instance have the form of copper tubes of small bore, the resistance of which can be varied by suitably changing the tube portions forming part of the flow passage. A variety of structures for such purposes are known and it is believed to be unnecessary to illustrate them in detail, the invention being concerned with the system, not with the details of the elements.

The system is shown as additionally including separate means 29, 30 for measuring lubricant pressures between each control system 27, 28 and the respective bearing. An additional measuring device 31 is provided between pump 24 and the control systems. In parallel with the latter device a surge tank 32 is provided, wherein an oil level 33 is maintained below an air cushion 34 for filtering pressure surges caused by pump 24 and which might otherwise cause vibratory changes of dimensions of bearing zones 22, 23. It is further possible to provide filtering or damping means of similar kind between control systems 27, 28 or between portions thereof, for instance by connecting a similar surge tank between fixed and adjustable capillaries 27', 27'' and another between 28', 28'', thereby minimizing the progress of vibrations from one bearing to another.

The illustrated system also comprises a weight loaded valve 40 forming a bypass between the discharge and suction sides of pump 24 for maintaining a constant pressure ahead of control systems 27, 28. If this pressure tends to rise, for instance due to changed efficiency of the pump, an increased hydraulic force is applied to the underside of a valve member in said valve, which enlarges the flow passage provided by the valve until a new equilibrium is established by the corresponding displacement of the valve weight and the consequent increase in the lever moment thereof, acting on the other side of the valve member. In this way a pressure is maintained below said valve member, and accordingly ahead of systems 27, 28, which is determined by weight data of the valve. A fixed weight 41 of the valve keeps this pressure constant, whereas a shiftable weight can be used to adjust this pressure.

The physical significance of the illustrated system and the operation thereof can best be explained in connection with the block diagram of Figure 3. One of the bearing zones is here shown by block 50; it can be conceived as a restrictor portion in the lubricant system, in which portion a laminar flow of lubricant prevails, and which portion has variable area. Lubricant is supplied to restrictor 50 by pump 52 in the direction of the vertical arrow and through a second restrictor 59 which as mentioned serves the known function of keeping bearing zone 50 functionally separate from one or more additional bearing zones supplied from 52; and the return flow of lubricant is indicated by the horizontal arrows. The relations between the flow conditions in restrictors 50 and 59 can briefly be described as follows, so long as relative motion between bearing elements 9, 13 (Figure 2), affecting the conditions at 50 (Figure 3), can be neglected.

The pressure $p_{50}$ ahead of restrictor 50, that is, in inlet chamber 21 of bearing zone 22 (Figure 2), depends on the weight of the mass supported by this bearing (Figure 1) and on the geometry of the bearing. Assuming constant weight, a constant lubricant thickness $h$ in zone 50 (Figure 3) requires a constant value $$\frac{I\eta}{p_{50}}$$

wherein $I$ signifies the lubricant volume flowing through the bearing per unit of time and $\eta$ signifies the viscosity of the lubricant. Thus neither a constant volume $I$ nor a constant pressure $p_{50}$ leads to a constant positioning dimension $h$ because of the influence of viscosity, which in turn depends on lubricant temperatures. These temperatures themselves could be regulated, but only with a time lag, which would introduce positional inaccuracies; moreover the expense would be great.

According to the invention the added restrictor 59 serves not only to functionally separate bearing 50 from other bearings but also to eliminate the effect of changing viscosities by compensating for the flow characteristics of bearing restrictor 50 by those of added restrictor 59. The volume of flow per unit of time, through restrictor 50, varies directly as $$\frac{\eta}{p_{50}h^3} \quad \text{(Expression 1)}$$

whereas the corresponding volume through restrictor 59 varies directly as $$\frac{p_{59}-p_{50}}{\eta} \quad \text{(Expression 2)}$$

the flow in said restrictor 59 being laminar or in other words, satisfying the Hagen-Poiseuille law. The ratio between the pressures prevailing ahead of both restrictors, that is, between pressures $p_{59}$ and $p_{50}$, may be expressed as $\lambda$; and the two volumes are evidently equal; thus we arrive at the result that $h^3$ varies directly as $$\frac{p_{59}-p_{50}}{p_{50}} \quad \text{(Expression 3)}$$

or as $\lambda-1$.

Thus a constant ratio of pressure $p_{59}$ to pressure $p_{50}$ leads to a constant value of thickness of the hydrostatic support layer $h$.

In the system of Figure 2, where $p_{59}$ is kept constant by valve 40 (or in some cases by the use of a suitable discharge pump driven by a synchronous motor and having a capacity considerably greater than the lubricant flow actually pumped) the uniformity of the pressure ratio, under variable viscosities, is obtained by the variation of system 27″ or 59. Variations of weight supported by the bearings, as well as the above-mentioned variations in efficiency of pump 24 can be compensated for, by suitably shifting a shiftable weight 41 or the like, as will be understood from Figure 2.

The basic system 52, 59, 50 of Figure 3, which has been described up to now, can also be adapted to automatic response to variations of $p_{50}$ or related variations. A control loop for such purposes is shown at 53 to 56. A device 53, 54 applies the pressures $p_{50}$, $p_{59}$, prevailing behind and ahead of restrictor 59, to a comparing device 55 which by means of suitable mechanical or other linkage 56 controls the pump system 52, for instance by automatically shifting weight 41 (Figure 2). Of course, where the discharge pressure of the pump is truly constant, line 54 may be omitted; where the mechanical load on bearing 50 is constant, line 53 may be omitted; and where both conditions exist, as in Figure 2, both lines can be omitted. A comparing device of the type schematically shown at 55 is disclosed in Wuensch et al. Patent No. 2,670,464, where leads 3 and 4 are comparable to the present leads 53 and 54, respectively, and wherein the pressure transmission line 56 is shown as an electrical line. It can control pump 52 for instance by varying the speed of the motor thereof.

It is further possible to modify the control loop 53, 55, 56 by sensing a function of the pressure ratio rather than the pressure ratio itself. For instance the position of a movable bearing element may be determined by electrical or magnetic means or the like for the regulation of the lubricant control system; or it may be preferred to determine the position of such an element by pneumatic or so-called Solex sensing means, with minimum disturbance by vibrations. Figure 4 shows a system of this kind at 60, with an air jet nozzle 61 directed against the top of sphere 9. Compressed air is supplied through a throttle 62 and the pressure of the air ahead of nozzle 61 is used by suitable transmission means 63 for the control of a regulator 64, which is similar to comparing device 55, modifying the position of a bypass valve 65 between the discharge 66 and the suction 66′ of a pump, supplying restrictor 67 in feed line 68 of bearing 9′, 13′. The return line is here shown at 69.

I claim:

1. In apparatus for hydrostatically supporting and positioning a structure, such as a telescope frame, with high positional accuracy; a pair of hydrostatic bearing sockets; a bearing element, rigid with said structure, in each of said sockets for defining a bearing zone; a source of lubricant of variable viscosity; passages leading from said source, one to each of said bearing zones, with a restrictor in each passage; a pump for supplying lubricant from said source to each passage and thereby to each bearing zone for supporting each bearing element and for spacing it from the respective socket; means for keeping said spacing highly uniform regardless even of minor variations of said viscosity, said means comprising a regulator associated with each passage for regulating the ratio of the pressure of said lubricant prevailing between the pump and the restrictor to the pressure of said lubricant prevailing between the restrictor and the bearing zone; a return passage from each bearing zone; a bypass connecting the passages leading from the source with the return passages; and a control valve in the bypass for maintaining a predetermined pressure ahead of the restrictor means regardless of variations of said viscosity.

2. In apparatus for hydrostatically supporting and positioning a structure, such as a telescope frame, with high positional accuracy; a pair of hydrostatic bearing sockets; a bearing element, rigid with said structure, in each of said sockets for defining a bearing zone; a source of lubricant of variable viscosity; passages leading from said source, one to each of said bearing zones, with a restrictor in each passage; a pump for supplying lubricant from said source to each passage and thereby to each bearing zone for supporting each bearing element and for spacing it from the respective socket; means for keeping said spacing highly uniform regardless even of minor variations of said viscosity, said means comprising a regulator associated with each passage for regulating the ratio of the pressure of said lubricant prevailing between the pump and the restrictor to the pressure of said lubricant prevailing between the restrictor and the bearing zone; a control valve communicating with said passages ahead of said restrictors, for regulating said pressure prevailing between the pump and each restrictor; and means governed by the position of said structure for governing said control valve.

References Cited in the file of this patent

UNITED STATES PATENTS

| | | |
|---|---|---|
| 949,780 | Saegmuller | Feb. 22, 1910 |
| 1,499,332 | Baumann | July 1, 1924 |
| 2,245,378 | Arms | June 10, 1941 |
| 2,459,826 | Martellotti | Jan. 25, 1949 |
| 2,578,711 | Martellotti | Dec. 18, 1951 |
| 2,578,712 | Martellotti | Dec. 18, 1951 |
| 2,578,713 | Martellotti | Dec. 18, 1951 |
| 2,586,269 | Smathers | Feb. 19, 1952 |
| 2,663,977 | Gerard | Dec. 29, 1953 |
| 2,670,464 | Wuensch | Feb. 23, 1954 |
| 2,692,803 | Gerard | Oct. 26, 1954 |
| 2,760,832 | Bidwell | Aug. 28, 1956 |
| 2,788,862 | Langer | Apr. 16, 1957 |

OTHER REFERENCES

"Air Lubricated Bearings" by Mueller—Product Engineering, 1953 Handbook, pages J2–J5.